March 8, 1955  E. D. NYSTRAND  2,703,639
CONTROL MECHANISM FOR CLUTCHES OR THE LIKE
Filed Jan. 13, 1950  2 Sheets-Sheet 1
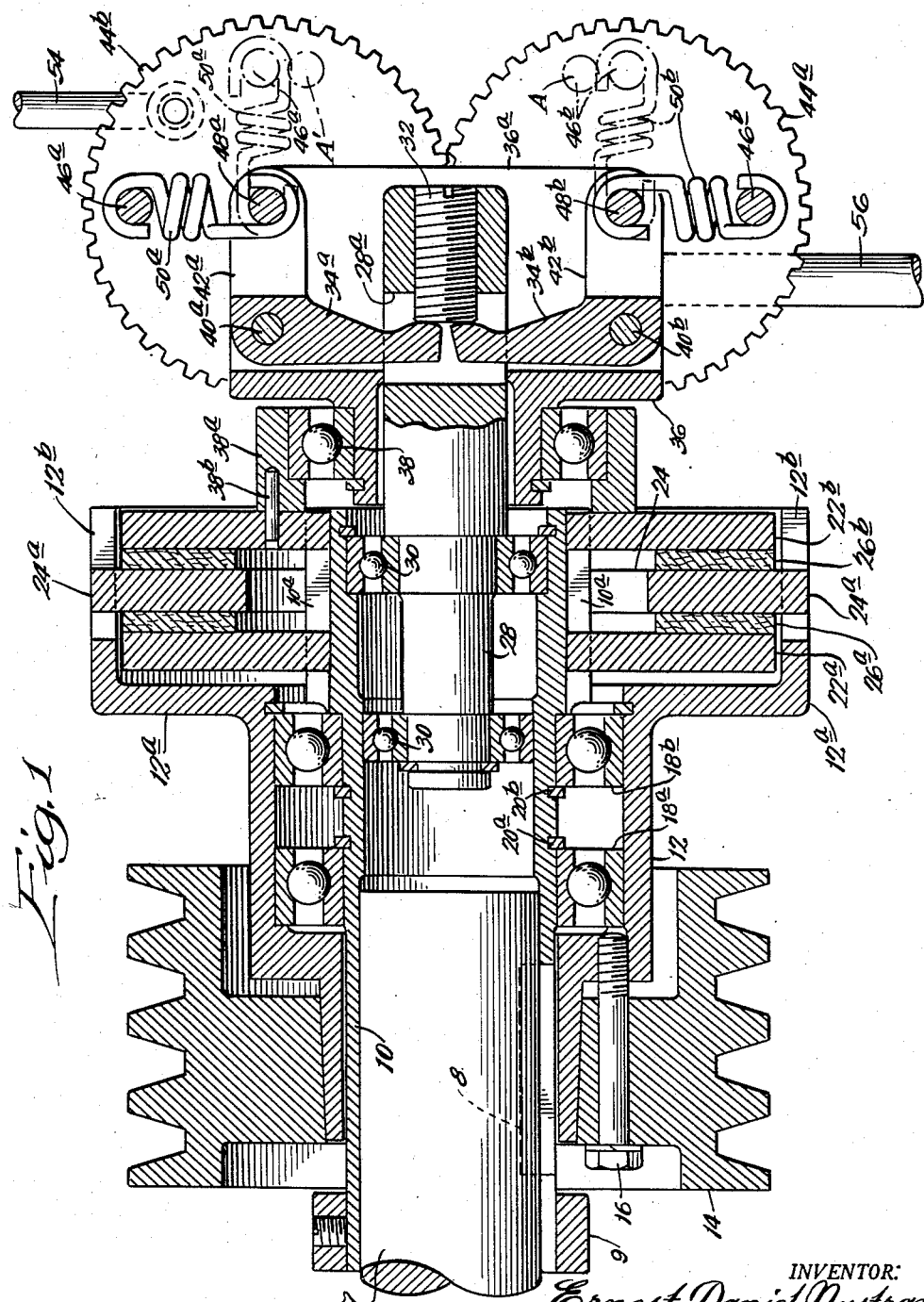
INVENTOR:
Ernest Daniel Nystrand,
BY Dawson, Ooms, Booth and Spangenberg,
ATTORNEYS.

March 8, 1955 E. D. NYSTRAND 2,703,639
CONTROL MECHANISM FOR CLUTCHES OR THE LIKE
Filed Jan. 13, 1950 2 Sheets-Sheet 2
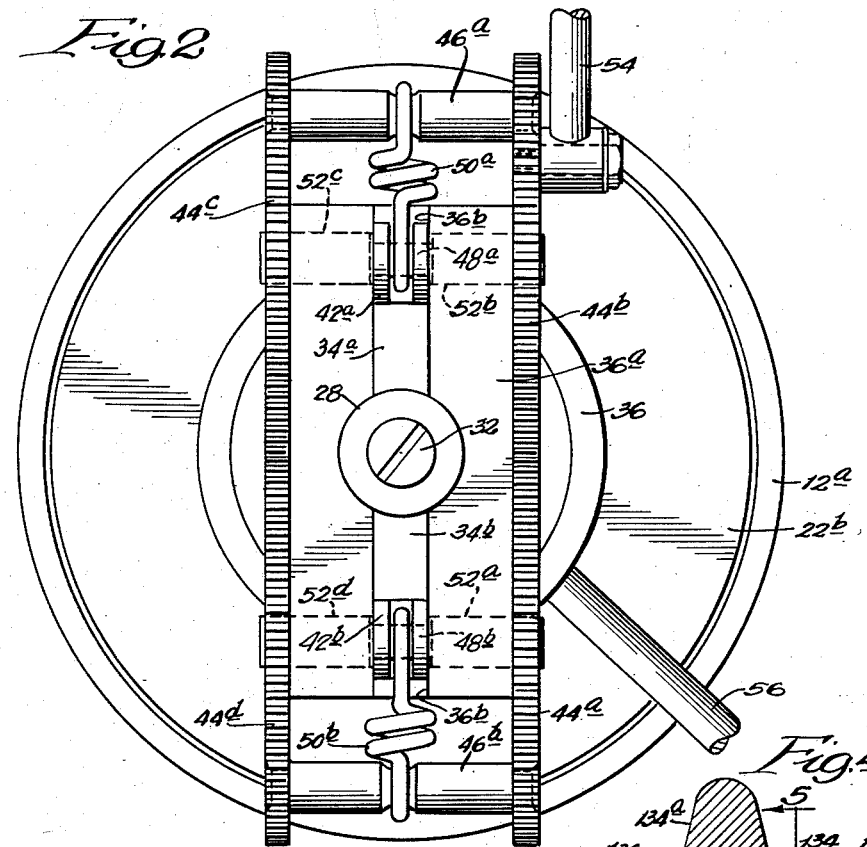
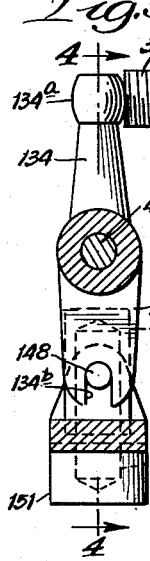
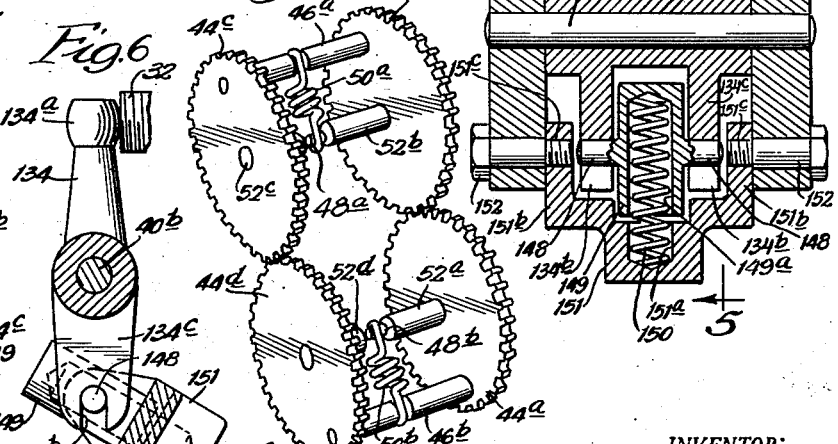
INVENTOR:
Ernest Daniel Nystrand,
BY Dawson, Ooms, Borth and Spangenberg,
ATTORNEYS.

United States Patent Office 2,703,639
Patented Mar. 8, 1955

2,703,639

CONTROL MECHANISM FOR CLUTCHES OR THE LIKE

Ernst D. Nystrand, Green Bay, Wis.

Application January 13, 1950, Serial No. 138,499

6 Claims. (Cl. 192—99)

My invention relates to an improved control mechanism for a clutch or the like to effect a controlled motion without exertion of substantial energy.

Control devices, such as clutches, are frequently used to achieve a controlled application of a large force in response to a relatively low-energy control. For example, in a machine to wind paper, it is necessary to provide a carefully controlled tension on the web to avoid breakage on one hand and to avoid loose winding and undue slack on the other. This control must be responsive to the small force capable of being exerted by the tension responsive elements.

Heretofore, tension control on paper webs has been effected by friction clutch drives with shiftable mating clutch faces urged together in response to the web tension. These clutches, however, have been subject to the disadvantage that controlled force must be applied to them, the amount of the force determining the effective driving engagement. Because of this variation in force (it has been necessary to use large, cumbersome control mechanisms that are expensive because of the mechanical power levels involved and that have large inertia rendering the entire control system sluggish and subject to oscillation and instability.

In accordance with the present invention the large control mechanisms heretofore required to exert varying force on the clutch members is obviated by the provision of a simple and effective mechanism exerting a constant force of variable orientation. Since the orientation of the applied force rather than its amount is controlled, it is possible to control the clutch itself by small, low power level equipment with the associated low expense, low inertia, and minimum tendency for instability and oscillation. The force required to operate the control of the present invention is fixed by the relatively small frictional resistance of the moving parts and is substantially uniform over the entire range of adjustment.

It is therefore a general object of the present invention to provide a control mechanism wherein a constant force is applied to achieve the necessary control movements.

Another object of the present invention is to provide a control mechanism capable of holding its preset controlled condition without application of holding force.

Yet another object of the present invention is to provide a control mechanism for clutches and like devices having a positive lock-out in the released condition to assure absence of residual engagement.

Still another object of the present invention is to provide an improved control mechanism for a clutch or the like that is of balanced construction and exhibits no tendency to cock or jam the relatively movable parts.

Another object of the present invention is to provide an improved control mechanism wherein the control may be actuated by a relatively small force sufficient only to overcome slight friction of the parts and the force required for movement is substantially constant over the entire range of adjustment.

The novel features of the present invention are set forth with particularity in the appended claims. My invention itself, however, both as to its organization and method of operation, together with further objects and advantages thereof, may best be understood by reference to the following description taken in connection with the accompanying drawings, in which:

Figure 1 is an axial cross-sectional view of a clutch with a control mechanism constructed in accordance with the principles of the present invention;

Figure 2 is an end elevational view of the clutch of Figure 1;

Figure 3 is a perspective view of a fragmentary portion of the clutch of Figures 1 and 2;

Figure 4 is a cross-sectional view of a modified form of the clutch actuating device of the present invention take non line 4—4 of Fig. 5;

Figure 5 is a cross-sectional view through the axis 5—5. Figure 4, with the actuating mechanism in the release position; and Figure 6 is a view like Figure 5 showing the mechanism in a clutch engaging position.

Referring now to Figure 1, there is shown at 10 a first shaft and at 12 a second shaft coaxial therewith. The latter shaft receives the sheave 14 which is connected thereto by the cap screws 16 which force the interior conical surface sheave 14 into a tight frictional engagement with the mating outer conical surface of the shaft 12. The shaft 12 is supported from the shaft 10 by the spaced ball bearings 18a and 18b which are retained in their spaced positions by the snap rings 20a and 20b, respectively. Shaft 10 is mounted and held securely on shaft 7 by means of key 8 and set collar 9. Shaft 7 may be the driver or the driven shaft on a machine.

The purpose of the mechanism is to establish an adjustable driving connection between sheave 14 and the inner shaft 7. This connection is established by the mating annular friction members 22a, 24, and 22b. Members 22a and 22b are keyed to the shaft 10 which has a pair of diametrically opposed keyways 10a into which mating tongues formed on members 22a and 22b fit. These members are therefore constrained to rotate in unison with the shaft but are free for axial shifting movements relative thereto.

The inner member 24 is received in the enlarged bell shaped end portion 12a of the shaft 12. This member has a pair of diametrically opposed tongues 24a which are received in the slots 12b formed in the bell portion 12a of the shaft 12, thus confining the member 24 to rotations in unison with the shaft 12 without interfering with shifting movements of member 24 in response to pressures exerted by members 22a and 22b.

A pair of annular friction face plates 26a and 26b are sandwiched between members 22a, 24, and 22b. These plates are of material having good frictional characteristics. Preferably they are cemented or otherwise attached to one of the members with which they engage.

A stationary shaft 28 is supported by spaced bearings 30 inside the end of the shaft 10. This shaft extends outside of shaft 10 and has a diametrical opening 28a located adjacent its free end. This end of the shaft 28 also has a threaded opening to receive the bearing member or set screw 32 which projects an adjustable distance interiorly of the opening 28a to define an adjustable surface against which levers or dogs 34a and 34b bottom.

A cooperating rotationally stationary member 36 is attached to the disk 22b by the bearing 38. This attachment is made through the collar 38a on which the bearing 38 is tightly received and the dowel pin 38b which secures the collar to the member 22b. The member 36 enlarges at its open end to define the rectangular portion 36a. This portion has a pair of diametrically opposed slots 36b, Figure 2, to receive the dogs 34a and 34b.

The dogs 34a and 34b are rockably supported in the slots 36b by the pins 40a and 40b. These pins extend in alignment with each other in a plane transverse to the axis of the shaft 28. Each dog has an inwardly extending arm in engagement with the set screw 32 on shaft 28 and a crank arm (42a and 42b) extending transversely of the inwardly extending arm.

The gears 44a, 44b, 44c and 44d are rotatably supported on axes 52a through 52d respectively and are arranged in pairs comprising gears 44a and 44d, and 44b and 44c, the gears in each pair being tied together respectively by anchors or pin members 46b and 46a. The gear pairs are aligned with each other to afford meshing engagement of the gears 44a and 44b, and 44c and 44d. As is seen best in Figs. 2 and 3, the gear axes and pins 48a and 48b lie generally along the same line or axis but are not connected to each other.

It will be evident that when arms 42a and 42b of the dogs 34a and 34b, respectively, are opened outwardly, the inwardly extending arms engage the screw 32 and force member 36, and hence member 22b in the left hand direction to exert axial pressure on the clutch disk 24a and effect increased driving engagement.

A series of four meshed gears 44a, 44b, 44c and 44d are mounted outside of the member 36. These gears are divided into pair 44a and 44d and pair 44b and 44c, the gears of each pair having coincidental shafts. Each gear meshes with the corresponding gear of the other pair. Pins 46a and 46b extend between gears 44a and 44d and 44b and 44c, respectively, and are positioned at corresponding points spaced from the respective axes of rotation of the gears. Consequently, if any one of the gears is rotated, all move in unison and the pins 46a and 46b move in unison to rotate the axes of action of springs 50a and 50b.

Dogs 34a and 34b are provided with pins 48a and 48b, respectively. These pins each extend across the forked arms 42a and 42b, respectively, and are positioned in alignment with the axes of rotation of the gears 44a to 44d when the mechanism is in one operating position. Preferably pins 48a and 48b are aligned with the axes of gears 44a to 44d when the mechanism is close to being fully engaged.

The pins 46a and 48a and 46b and 48b, respectively, are connected together by the tension springs 50a and 50b. Alternatively, other means, such as air or hydraulic pressure, may be used to urge these pins together with substantially uniform force while permitting slight relative movements of the pins.

The arrangement of the gears 44a to 44d, pins 46a and 46b and the related portions of the mechanism is best shown in the fragmentary perspective view of Figure 3. In this view the pins supporting the gears 44a to 44d are indicated at 52a to 52d, respectively; these pins are also shown by the dotted lines of Figure 2.

Controlling rotational movements may be imparted to the gears 44a to 44d by any suitable means. In the apparatus of Figures 1 and 2 the link 54 is pivotally attached to gear 44b for this purpose. As the link is moved back and forth, it acts as a crank to rotate the gears and vary the orientation of the forces exerted by springs 50a and 50b.

The complete rotationally stationary unit comprising shaft 28 and member 36 is held stationary by the arm 56 which fits into a suitable opening in the member 36 and is held against rotation by a suitable stop device external to the mechanism (not shown).

In operation, the gears 44a to 44d are rotated by link 54 to rotate pins 46a and 46b about the axes defined by pins 52a to 52d. This rotation alters the orientation of the forces exerted by the springs 50a and 50b on the pins 48a and 48b. In the position shown by the solid lines of Figure 1, the moment arms defined by these forces cover the full distance between pins 40b and 48b and between pins 40a and 48a. This gives maximum torque on the dogs 34a and 34b and urges the members 22a and 22b together with maximum force.

When the gears 44a to 44d are rotated 90 degrees to the position shown by the dotted lines of Figure 1, the lines of action of the forces of these springs pass through the pins 40a and 40b, with the consequence that the moment arms are zero and no torque is exerted by the springs on the dogs. At this point no force urges the members 22a and 22b together.

In the intermediate positions the effective moment arms of the spring forces vary from the maximum value to zero and the forces on the members 22a and 22b vary accordingly. Consequently, when the gears or control members 44a to 44d are rotated, the forces on the members 22a and 22b are varied uniformly and rotation of members 44a to 44d controls the forces on members 22a and 22b.

The power required to rotate the gears 44a to 44d is small and uniform. The springs 50a and 50b exert constant forces. Consequently, the friction opposing gear movement does not vary significantly. The force necessary to rotate the gears is only the force necessary to overcome this friction.

Moreover, in practical clutches made in accordance with the present invention, the friction holding the gears, while very small, has been adequate to retain any desired setting of the clutch. Consequently, it is unnecessary to provide holding devices to prevent movements of the mechanism from any preset condition.

Moreover, the mechanism of the present invention may be adjusted to a positively released position by rotating the gears 44a to 44d to move pins 46a and 46b beyond the zero-torque positions. Such over-center positions are shown at A and A', Figure 1, where the pins 46a and 46b are shown in dotted lines.

When the pins 46a and 46b are in the positions A and A', the moment arms of the forces of springs 50a and 50b produce torques on the dogs 34a and 34b tending to rock these dogs to spaced positions relative to set screw 32. This frees the members 22a and 22b from the action of the dogs and positively releases the clutch mechanism.

Figures 4, 5, and 6 show an alternative embodiment of the present invention wherein a compression spring force is used and is given a varied orientation to effect control of the net force against set screw 32, Figure 1, and therefore control the frictional engagement of the clutch surfaces. As shown in Figure 6, the single dog 134 is supported on the pin 40b shown in Figure 1. This dog has a headed portion 134a that seats against the set screw 32 to effect a controllable force thereagainst for clutch actuation. The opposite end of the dog is slotted at 134b to receive the pin 148. As shown in Figure 4, the dog 134 is forked at the end 134c to receive the cup 149 formed unitarily with the pin 148. Cup 149 has an opening 149a to receive the helical compression spring 150. One end of this spring seats in the bottom of the opening 149a and the other end seats in the bottom of the mating bore 151a of the rockable control member 151. As seen best in Figure 4, the control member 151 is forked at 151b and is provided with threaded openings 151c substantially in alignment with the pins 148. Pin-bolts 152 are threadedly received in the openings 151c to support the member 151 for rocking movements relative to the member 136 which defines two arms to receive these pins as shown in Figure 4.

The member 136 is supported from the clutch mechanism in the same fashion as member 36, Figure 1, and differs from that member only in defining two arms to receive the pin-bolts 152.

Figure 5 shows the mechanism of Figure 4 in the clutch releasing condition. In this condition the member 151 is rocked to point the bore 151a directly at the pin 40b. In this condition, the compression force exerted by spring 150 against the cup 149 is directed through the pin 40b, thus exerting no moment to urge head 134a against the set screw 32. Consequently, the clutch is released.

In Figure 6 the mechanism is shown in the clutch actuating position where force is exerted by head 134a against set screw 32. In this condition the member 151 is rocked to direct the bore 151a at an angle relative to the line between pin 148 and head 134a. Consequently, the compression force of spring 150 against the cup 149 develops a moment tending to drive head 134a to the right and exerting corresponding force against set screw 32. The clutch faces are accordingly urged toward each other to effect the desired frictional engagement.

From the foregoing description it will be evident that the structure shown in Figures 4, 5, and 6 controls the force exerted by the clutch members by rocking motions of member 151 and that a continuous motion is achieved by this rocking motion without exertion of any greater energy than is required to overcome the relatively small frictional force in the unit and to accompany the relatively slight relative movements of the pins 148 and 152.

While I have shown and described the present invention with reference to its particular application to a clutch, it will, of course, be understood that it may be used for other purposes. In general, it is applicable to any mechanism wherein variable controlled forces are applied between two members which themselves execute limited movements. By providing rockable dogs to urge the members together, and varying the direction of orientation of a constant force exerted on the dogs, the effective force on the members is varied as desired by exertion of a uniform force determined only by the frictional opposition to rotation of the control member.

The set screw 32 provides an adjustable takeup of the slack that may exist between dogs 32a and 34b and the desired maximum force on members 22a and 22b. This permits setting of the mechanism to achieve predetermined maximum torque, as well as to adjust for wear on friction plates 22a and 22b.

In the appended claims I have used the term "substantially aligned with a point on said dog" to describe the positions of pins 52a to 52d. Preferably these pins are located on axes in the path of travel of the points on the dogs where the springs 50a and 50b are pinned. However, deviations may be made from this condition without preventing achievement of the benefits of the present invention in a substantial measure. I therefore do not intend to limit the appended claims to exact coincidence between the axes.

While I have shown and described a specific embodiment of my invention, it will of course be understood that many variations and alternative embodiments may be made without departing from the true spirit and scope thereof. I intend by the appended claims to cover all such variations and alternative embodiments.

What I claim as new and desire to secure by Letters Patent of the United States is:

1. In apparatus for moving a member limited axial distances along a longitudinal axis with a force that is infinitely variable in magnitude between predetermined limits by application of a control force that is substantially constant in magnitude, a movable member, means for supporting said member for axial movement, a bearing member mechanically independent of said movable member, a lever pivotally mounted intermediate the ends thereof on said movable member and having an end portion engageable with said bearing member and an opposite free end portion, an anchor member supported for rotation about an axis generally coincident with an axis through the free end portion of said lever that is substantially parallel with the pivotal axis thereof, yieldable means connecting the free end portion of said lever to said anchor and urging the same together, and means for rotating said anchor to change the orientation of the force exerted by said yieldable means on the free end portion of said lever.

2. The structure of claim 1 in which said yieldable means is a spring.

3. The structure of claim 1 in which said means for rotating said anchor comprises a gear member, said anchor being secured to said gear member and spaced from the rotational axis thereof, and means are provided for rotating said gear member.

4. The structure of claim 1 in which said lever is an L-shaped dog and the pivotal axis thereof is substantially in the area of the intersection of the legs of the L-shaped dog.

5. In a mechanism for exerting an adjustable force between two members and in which the force is infinitely variable in magnitude between predetermined limits by application of a control force that is substantially constant in magnitude, a movable member, a second member that is substantially fixed against axial movement, means for supporting said movable member for axial movement relative to said second member, a bearing member structurally independent of said movable member and having a fixed position relative to longitudinal movement of said movable member, a pair of levers pivotally mounted intermediate the ends thereof on said movable member and each having an end portion engageable with said bearing member and an opposite free end portion, a pair of anchor members each supported respectively for rotational movement about an axis generally coincident with an axis through the free end portions of each of said levers and that are substantially parallel with the pivotal axis of the respective lever, yieldable means connecting the free end portion of each of said levers to one of said anchors and urging the same together, and means for rotating each of said anchors to change the orientation of the force exerted by the yieldable means on the free end portion of said levers.

6. A mechanism for exerting an adjustable force between two members, one of said members being movable along a longitudinal axis relative to the other of said members, comprising a dog rockably supported upon said movable member and having a first free end portion engageable with a bearing member with which the other of said members is equipped, said dog also providing a second free end portion spaced from said first free end portion, and means for applying a force of substantially constant amplitude to said second free end portion of said dog but of adjustable orientation, said means including a movable anchor coupled to said second free end portion of said dog by yieldable means urging the dog and anchor together, said anchor being rotatable about an axis generally coincident with an axis through said second free end portion of said dog and substantially perpendicular to a plane defined by the face of said dog and generally parallel with the axis of said dog about which it rocks.

References Cited in the file of this patent

UNITED STATES PATENTS

| | | |
|---|---|---|
| 1,358,294 | Corlett | Nov. 9, 1920 |
| 1,804,903 | Wemp | May 12, 1931 |
| 1,887,635 | Gehres et al. | Nov. 15, 1932 |
| 2,458,364 | Foster | Jan. 4, 1949 |
| 2,613,777 | Carlson | Oct. 17, 1952 |

FOREIGN PATENTS

| | | |
|---|---|---|
| 386,837 | Great Britain | Jan. 26, 1933 |
| 628,252 | Germany | Mar. 31, 1936 |